July 8, 1969 — N. MALARKEY, JR — 3,453,951

FILTERING MEANS FOR FILTER PRESS

Filed Dec. 12, 1966 — Sheet 1 of 2

Neil Malarkey, Jr.
INVENTOR
BY Kolisch & Hartwell
Attys.

United States Patent Office 3,453,951
Patented July 8, 1969

3,453,951
FILTERING MEANS FOR FILTER PRESS
Neil Malarkey, Jr., Rte. 2, Box 2126,
Bainbridge Island, Wash. 98110
Filed Dec. 12, 1966, Ser. No. 601,049
Int. Cl. B30b 9/02
U.S. Cl. 100—118                     20 Claims

ABSTRACT OF THE DISCLOSURE

A filter belt is disclosed comprising a backing portion having an outer face forming the inner side of the belt, said backing portion having a series of exhaust passages defined therein which communicate with marginal edges of the belt and drain passages connecting with these exhaust passages, and a filtering portion overlying the backing portion having an outer face forming the front side of the belt, said filtering portion having interstices therein extending therethrough accommodating the flow of fluid into said drain passages whence such fluid may be expressed through the exhaust passages at the edges of the belt.

---

This invention relates to filtering apparatus, such as may be used to effect an extraction of liquid from a liquid-solid mixture. More particularly, the invention concerns filter means employable in a filter press to produce such liquid separation.

In a co-pending application entitled "Filter Press," having Ser. No. 563,007, filed June 20, 1966, and now U.S. Patent No. 3,381,609 issued May 7, 1968, various forms of filter presses are disclosed which feature opposed bands or drums presenting opposed converging walls defining a processing chamber in a press having diminishing side-to-side dimension progressing through the processing chamber. Filter belts extend through the processing chamber and envelope mixtures being processed, and filtrate is expressed from a liquid-solid mixture as the belts converge in the processing chamber with the filtrate moving toward marginal edges of the belts thence to be collected. The filter means of the invention has particular utility in such applications, where filtrate is expressed toward the marginal edges of a filter belt. It is not intended, however, by indicating such utility to be specifically limited to a particular type of press.

One object of this invention is to provide an improved type of filtering agency which is not subject to becoming rapidly clogged.

A further object is to provide an improved filtering agency capable of producing a relatively clear filtrate for mixtures containing finely divided solids.

Yet another object of the invention is to provide an improved filtering agency which lends itself to being cleaned.

A further feature and object is to provide an improved filtering agency of the type hereinabove described which is compressible to effect the expelling of liquid from marginal edges of the agency.

Another object is to provide new and improved means for cleaning such a filtering agency.

Another object is to provide a novel filter belt means having opposed faces and bounded between such faces by opposed marginal edges, with a construction facilitating the flow of filtrate first inwardly into the belt means and then in a lateral direction toward a marginal edge, to a zone where the filtrate is recovered.

In a filter press of the type described in the above-identified co-pending application, continuous operation is produceable with rotation of the drums or bands described. With such a press, and in a preferred embodiment of the invention, a pair of filter belt means as contemplated herein are employed to envelope a liquid-solid mixture in the processing chamber of the press and to squeeze solids in the mixture on the belt means coming together with rotation of the drums thus to express liquid from the solids.

According to an embodiment of the invention, the filter belt means may comprise an elongated, continuous backing portion having an essentially nonporous composition save for drain and exhaust passages provided at intervals in the backing portion to accommodate the travel of filtrate from one side of the backing portion inwardly into the backing portion and then laterally to the edges thereof. Overlying the backing portion is an elongated filtering portion which is porous and operates to separate filtrate from solids in a mixture. The filtering and backing portions may be distinct and separable elements, enabling one to be replaced without the other. As contemplated herein, and by way of example, the backing portion may be made of a flexible, and resilient plastic material, and the filtering portion may comprise a porous, flexible web having relatively small interstices distributed throughout accommodating the flow of fluid through the web. As further contemplated, a flexible transfer portion may be provided between the filtering portion and backing portion, offering less resistance to fluid flow than the filtering portion, and functioning primarily to provide free flowing flow paths for fluid passing through the filtering portion, whereby such may travel in directions extending through the thickness of the filter belt and laterally, to reach the drain passages distributed in the backing portion.

These and other objects and advantages are attained by the invention, and the same is described hereinbelow in conjunction with the accompanying drawings, wherein.

Figure 1:
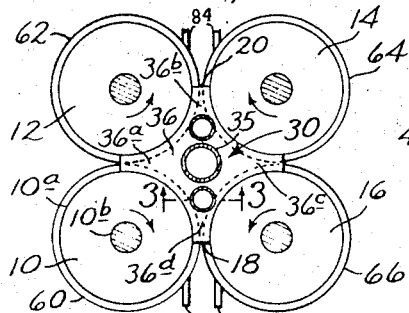
FIG. 1 is a top plan view of a filter press provided with filter belt means as contemplated herein.
Figure 2:
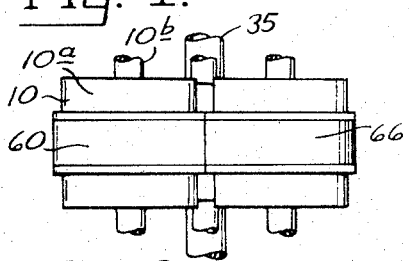
FIG. 2 is a side elevation of portions of the press shown in FIG. 1.

Considering first of all FIGS. 1 and 2, in the press illustrated opposed drums or cylinders are shown at 10, 12, 14 and 16 bounded by nonperforate outer cylindrical surfaces, such as the one shown at 10a for drum 10.

In FIGS. 1 and 2, the press is shown with the frame which supports the operating parts, drive mechanism and other structure omitted. Drums 10, 12, 14 and 16 are mounted on upright shafts, such as shaft 10b for drum 10, and it should be understood that these shafts are journaled in suitable bearings in the press (not shown), which are drivingly connected to suitable drive means (also not shown) whereby the drums are rotated. In FIG. 1 the direction of rotation of an operating embodiment of the invention is shown by the arrows, which arrows indicate drums 10 and 14 rotating in a clockwise direction, and drums 12 and 16 rotating in a counter-clockwise direction. A bite or nip 18 is defined by drums 10 and 16, with the outer surfaces of these drums converging progressing in a direction extending toward such bite, and similarly a bite or nip 20 is defined between drums 12 and 14, with the outer surfaces of these drums converging progressing toward this bite.

Mounted within the space generally encompassed by the various drums is a collector 30 which is utilized to collect filtrate produced by the press, and also to supply mixtures for processing.

Collector 30 comprises a top closure assembly 32 adjacent one set of ends of the rolls, and a bottom closure assembly 34 (see FIG. 3) which is similar in construction but spaced toward the opposite set of ends of the rolls. The two assemblies are mounted on a support shaft 35 which is suitably mounted in a stationary position on the framework of the press.

Figure 4:
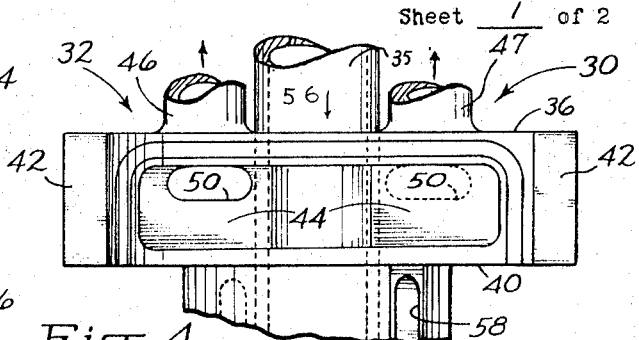
FIG. 4 is a view of FIG. 3 illustrating portions of a collector in the press.

The closure assemblies, as already explained, are similar in construction, and thus only one is described in detail. Referring to closure assembly 32, and now more particularly to FIGS. 1, 3, and 4, it comprises an outer web 36 having, when viewed in plan as seen in FIG. 1, four projections depicted at 36a, 36b, 36c and 36d. These radiate out from shaft 35 which extends down through the outer web and is secured thereto. The edges of these projections are curved to conform to the curving outer surfaces of the drums. Below web 36 is an inner web 40 (see FIG. 4) which has substantially the same outline in plan as the outer web, and thus includes projections which complement the projections illustrated for the outer web. Joining the extremities of complementing projections are plate portions, such as those shown at 42.

Between the outer and inner webs, and radiating from shaft 35, are divider walls 44 which divide the space between the outer and inner webs into recesses or pockets facing the outer surfaces of the drums which are for the collection of filtrate. Communicating with these recesses or pockets are conduits 46, 47 provided for the removal of filtrate. Adjacent pockets may also be connected in a region between the webs through apertures, such as those illustrated at 50.

The top closure assembly may be sealed to the outer surfaces of the various drums by means of sealing strips, such as the one shown at 52.

Although not specifically illustrated herein, the bottom closure assembly may have similar inner and outer webs defining similar pockets. Conduits, such as the one shown at 54, connect with these pockets to provide a path for the removal of filtrate.

It will be noted that shaft 35 has a passage 56 extending downwardly thereinto, and this passage provides a feed path for the material to be filtered in the press. This feed passage connects with the space between the closure assemblies through such a passage as the one shown partially in FIG. 4 at 58.

For a more complete description of a press similar to the one just described, and for a explanation of other press modifications such as may utilize the filter belt means of this invention, reference may be made to the co-pending application above-referred to entitled "Improved Filter Press."

In FIGS. 1 and 2 it will be noted that four elongated filter belt means, depicted at 60, 62, 64 and 66, girdle drums 10, 12, 14 and 16 approximately midway between the ends of these drums. Each filter belt means, more simply now referred to as a filter belt, extends between the top and bottom closure assemblies, with its opposite marginal edges pressing snugly against the inner webs of the closure assemblies.

Figure 5:
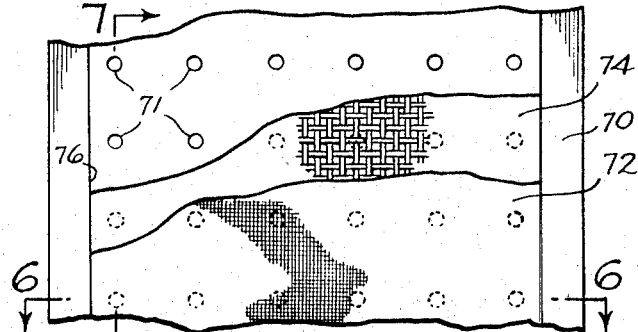
FIG. 5 is a view on a still larger scale, illustrating portions of a filter belt, and showing parts of such belt broken away.
Figure 6:
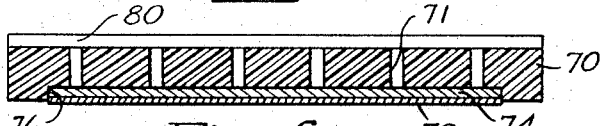
FIG. 6 is a cross-sectional view taken generally along the line 6—6 in FIG. 5.
Figures 7, 8:
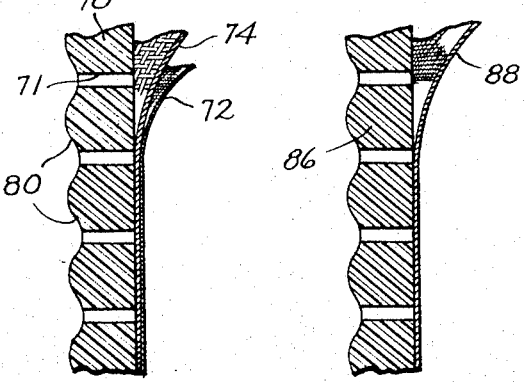
FIG. 7 is a cross-sectional view taken generally along the line 7—7 in FIG. 5.
FIG. 8 is a cross-sectional view, similar to FIG. 7, but illustrating a modified form of the invention.

Considering now the construction of a filter belt, and referring more particularly to FIGS. 5, 6, and 7, the modification of the belt shown in these figures comprises an elongated, continuous belt portion 70, referred to as a backing portion, which forms the inner side of the belt, and an elongated, continuous belt portion 72, referred to as a filtering portion, which forms the opposite or outer side of the belt. Disposed intermediate the filtering portion and the backing portion is an elongated belt portion 74, referred to as a transfer portion. The various belt portions may be separate pieces which are assembled with one adjacent another to prepare the completed belt.

The filtering portion comprises a porous web having interstices distributed therethroughout, and is the agency in the filter belt producing separation of filtrate from the liquid-solid mixture. The size of the interstices of such filtering portion will vary, depending upon the types of materials handled and the degree of separation desired. Exemplary of the materials that may be employed for the filtering portion are a fine mesh metal screening, a relatively finely woven nylon cloth, or a porous fibrous mat. By way of example, the interstices remaining between the strands making up the filtering portion might have a cross-sectional area in the neighborhood of 0.0001 sq. inch. The type of material used in the filtering portion, whether metal, plastic or other material, depends upon such factors as the wear or corrosion resistance necessary, the belt life desired, etc. The filtering portion being relatively thin (commonly the thickness of the filtering portion may range from $\frac{1}{32}$ to $\frac{1}{16}$ of an inch) and the interstices in this filtering belt portion passing essentially directly across the thickness thereof, there is minimal tendency for this part of the filter belt to become clogged with solid material and become ineffective as a filtering medium.

Transfer portion 74 which backs up the filtering portion may also be a woven fabric or screen, or may have a mat construction. Generally, it is characterized by having interstices therein of substantially greater size (typically at least twice the size) than the interstices of the filtering portion. As should be apparent on examining a coarsely woven screen, flow of filtrate is accommodated both through the thickness of the transfer portion and in a direction extending laterally between marginal edges. The transfer portion is not intended to perform a filtering function by reason of the size of the interstices therein, and thus has little tendency to clog. The function of the transfer portion is to back up the filtering portion and to facilitate filtrate flow into the relatively widely dispersed drain passages (to be described) which are distributed in the backing portion.

Backing portion 70 may comprise a belt body of flexible, resilient material which is essentially nonpermeable by liquids. Filtrate flow through the backing portion takes place through well defined drain passages shown at 71, which are bores extending through the belt body spaced usually at least about a $\frac{1}{4}$ inch apart, and having typically cross-sectional areas ranging from 0.0007 to 0.05 sq. inch. The body being nonpermeable by liquids does not tend to absorb liquid as does a sponge. In a particular embodiment of the invention, a cast polyurethane body has been employed for the belt body, which is somewhat compressible by reason of grooves therein described below, but nonabsorbent. Typically the belt body may have a hardness ranging from 40–90 durometer, and a thickness exceeding $\frac{1}{4}$ inch.

As can be seen in FIGS. 5 and 6, the belt body is recessed along its length, over its inner face, with a channel 76. This recess receives the layers comprising the transfer portion and filtering portion, with the outer face of the filtering portion raised a slight distance above the level of the face of the backing portion.

The exposed face of the backing portion, which is its outer face, and forms the inner side of the belt, has a series of grooves 80 formed therein. These grooves generally parallel the outer faces of the backing portion, and at opposite ends open up to and thus communicate with the opposed marginal edges of the backing portion. Each of these grooves connects along the base thereof with an aligned series of drain passages extending through the backing portion. These grooves, also referred to as exhaust passages, accommodate the flow of filtrate from the drain passages in a lateral direction to the marginal edges of the filter belt.

For ease of cleaning the exhaust passages preferably along their lengths are open to the back face of the backing portion. Further, the bases of the grooves preferably are rounded thus to be devoid of sharp corners where material might collect.

Describing the operation of the press and the filter belts, drums 10 and 12 (which rotate with outer surfaces moving away from each other in that region of the press located between the closure assemblies) are mounted closely adjacent each other. With such close spacing, the belts which girdle these drums on passing through the bite or nip defined between the drums are compressed to such an extent as to produce flattening out of the grooves described for the backing portion. This tight compression prevents a liquid-solid mixture introduced between the closure assemblies from escaping between these rolls at this point. Rolls or drums 14, 16 have a similar close spacing, to produce similar compression of the belts girdling these drums. Considering drums 12 and 14, these drums are spaced a somewhat greater distance. On operation of the press, solid material carried on the belts girdling these drums is ejected from the press through the bite defined by these drums, and the greater spacing indicated between these drums accommodates such material. Drums 10 and 16 have a spacing similar to the spacing between drums 12 and 14 for the same reason. Shown at 82 and 84 are scraper assemblies for scraping solid material from the belts.

In the modification of the invention shown in FIG. 8, a filter belt is contemplated comprising a backing portion 86 and a filtering portion 88 directly overlying and supported on the backing portion. With the omission of the transfer portion in this modified form of belt, filtrate on traveling through the filtering portion moves laterally over the inner side of the backing portion to find the drain passages of the backing portion. With this type of belt, it is usually preferable to use as a filtering portion a web or screen of somewhat coarser mesh than the web or screen employed where a transfer portion is included. By eliminating the transfer portion, some simplicities in construction are realized and there is less retention of filtrate in the belt after being compressed by passage through the nip defined between opposed press drums.

Figure 3:
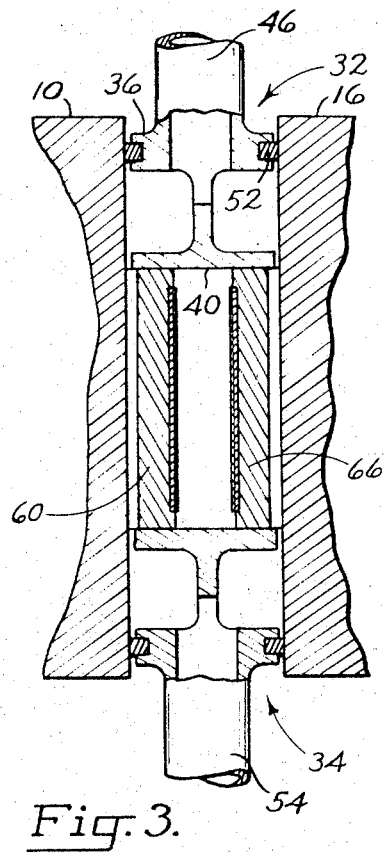
FIG. 3 is a cross-sectional view of FIG. 2.

On operation of the press, material to be filtered is admitted into the space between the closure assemblies through passage 56. Each belt on moving into the region bounded by the closure assemblies has opposite margins of its backing portion snugly engaging the inner webs of the closure assemblies, as shown in FIG. 3.

The pressure of the liquid-solid mixture being processed within the processing chamber of the press is determined by the pressure at which the liquid-solid mixture is fed into the processing chamber through passage 56. This pressure is above atmospheric pressure, and as a consequence liquid in the mixture tends to be forced through the filter belts into the pockets or recesses defined by the closure assemblies. Solid material in the liquid-solid mixture tends to be carried on rotation of the drums toward a nip defined between opposed drums. On reaching such nip, the solid material is squeezed tightly by the filter belts which are forced against such solid material by the opposed drums, and with such squeezing substantially all remaining liquid in the material being processed is expressed through the filter belts to be collected in the pockets. Opposed drums at the nip produce substantial pressures on the backing portions of the belts, causing compression of the backing portions (accommodated by the grooves or exhaust passages which extend across them), and constriction of the exhaust passages. This constriction of the exhaust passages in the backing portions has the effect of minimizing the amount of liquid retained in the filter belts on such filter belts moving beyond the nip. With the least possible liquid retained, there is minimal tendency of the solid residue carried on the opposite sides of the filter belt to become re-wetted by the already expressed liquid with relaxation of compression of the belts. If desired, and to increase the pressure differential producing the expressing of filtrate, a sub-atmospheric pressure may be maintained in the pockets.

Figure 9:
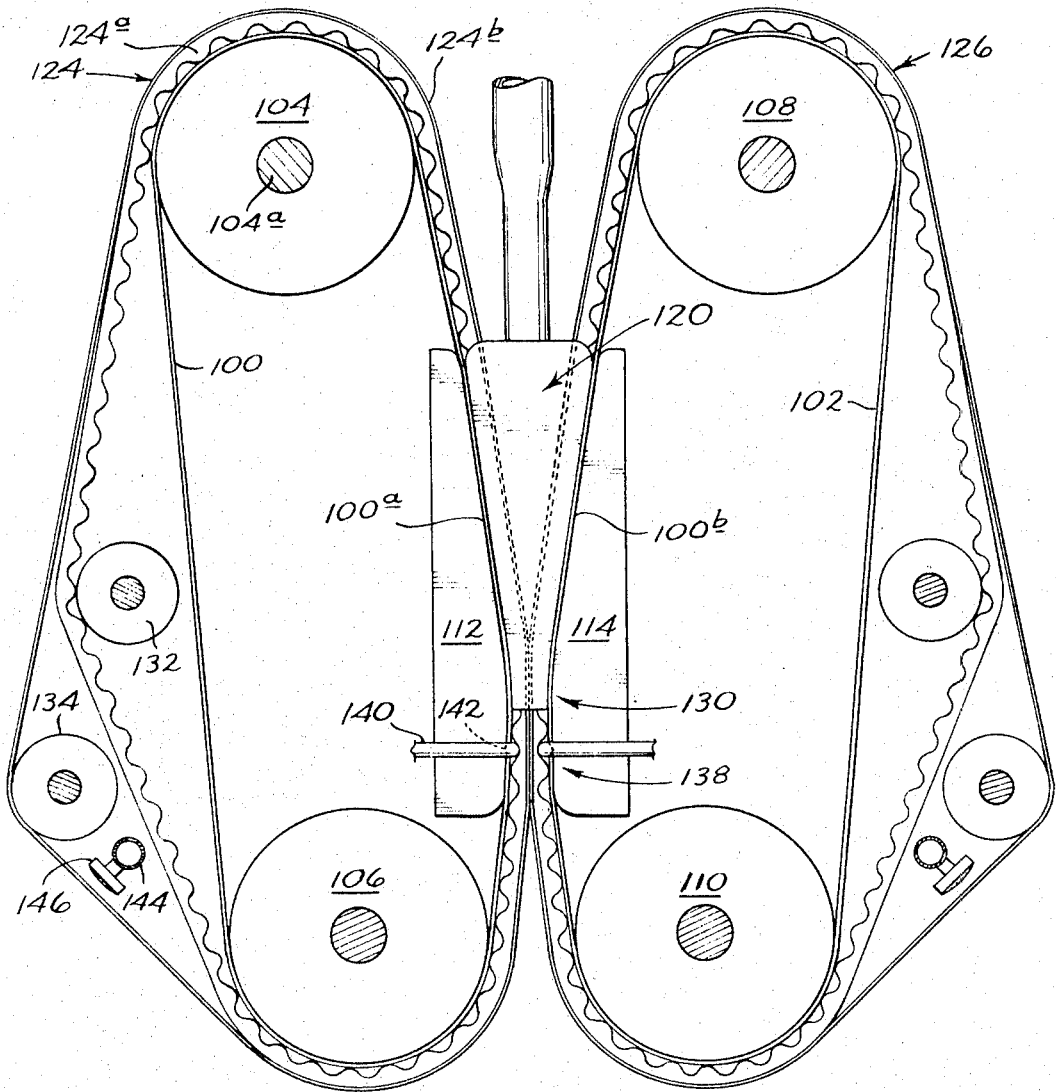
FIG. 9 is a somewhat simplified, side elevation of another form of filter press with filter belt means as contemplated herein.

Turning now to FIG. 9, here there is illustrated a modified form of filter press, where the processing chamber is defined by the opposed vertical reaches 100a, 102a of continuous, imperforate conveyor bands 100, 102. Band 100 is trained over rolls 104, 106, and band 102 over rolls 108, 110. These rolls are journaled on a suitable frame (not shown) through roll shafts, such as the one indicated at 104a.

Backing up the reaches of the bands defining the processing chamber of the press are a pair of pressure platens 112, 114. The bands slide over the facing sides of the platens, and the platens themselves are mounted in a suitable manner with a predetermined spacing between them. The facing sides of the platens converge on each other progressing downwardly in FIG. 9, and this convergence is imparted to reaches 100a, 102a of the bands. Mounted between the vertical reaches of the bands is a collector 120. This collector includes suitable means for the supply of a liquid-solid mixture to the processing chamber in the press, and recesses or pockets for collecting filtrate.

The press as so far described resembles another modification of press disclosed in the earlier filed application entitled "Improved Filter Press" above-referred to. The illustration of the press has been greatly simplified herein, as many details of its construction are not considered necessary for an understanding of the present invention, and reference is made to said application if a more complete description of the press is desired.

In the modification of the invention shown in FIG 9, filter belts shown at 124, 126 are provided which travel, while being supported on imperforate bands 100, 102, downwardly from upper rolls 104, 106 through the processing chamber of the press, and thence over rolls 108, 110 at the base of the press. As in the earlier described modification of the invention, material to be processed is enveloped by these filter belts in the processing chamber. In a region indicated generally at 130, where the opposed sides of the platens come to close adjacency with compression of the filter belts, pressure is applied against solid material carried between the belts, with the expressing of substantially all liquid from the mixture in this region, with such then being collected as filtrate in collector 120.

In this modification of the invention, each filter belt resembles the filter belt construction shown in FIG. 8, and includes a flexible and resilient backing portion, such as that shown at 124a for belt 124, and a flexible filtering portion, such as that shown at 124b for such belt.

The backing portion for each of the filter belts shown in FIG. 9 comprises an elongated, continuous belt element which in the press is trained over a noncircular course. Further explaining and considering element 124a, this belt element extends over band 100 where it is trained over roll 104 and thence follows the band downwardly through the processing chamber and over roll 106. Thence the element leaves the band to travel over a roller 132 journaled in the press to one side of band 100. The filtering portion for each filter belt is also a continuous belt element trained about a noncircular course. The belt element which is the filtering portion is somewhat longer than the element which is the backing portion, and outside the processing chamber extends in a reach which is spaced from the backing portion. Thus, and considering belt element 124b, this follows the element 124a in extending from roll 104 between the platens and over roll 106. Thence, however, element 124b diverges from element 124a and travels over a journaled roller 134.

The opposed sides of the pressure platens, in a region indicated at 138, which is spaced somewhat below the collector (and the pockets therein which collect filtrate) have essentially the spacing existing between the platen sides in region 130 where the filter belts are bounded by the collector. Thus the filter belts are compressed in region 138, and while this compression operates to constrict somewhat the exhaust passages in the filter belts, the compression is not sufficient completely to close the exhaust passages. It is contemplated that air conduits 140 be included, with air jets shown at 142 directed inwardly against the edges of the filter belts, which operate to eject streams of air against the filter belt edges and into the exhaust passages, to promote removal of filtrate and drying of the belts. When handling a liquid-solid mixture such as an aqueous slurry, where it is desired to obtain a solid product essentially free of water, this drying may be particularly advantageous in promoting removal of as much water as possible from the backing portions, thus to inhibit the absorption of such water in the solid residue with relaxation of compression of the belts.

With the modification of the invention shown in FIG. 9, where the belt element which is a filtering portion extends outside the processing chamber in a reach which is spaced from the backing portion, it may be advantageous to provide a water supply conduit, such as that shown at 144, feeding a water spray nozzle, such as is shown at 146, operable to direct wash water against the back of the belt element thus to cleanse it by backwashing it. This backwashing of the filtering belt element further inhibits clogging in the filter belt.

It will be seen that in both modifications of the invention, the flexible and resilient nature of the backing portion plays an important part in the invention. With the modification of the invention shown in FIGS. 1 and 2, this property of the backing portion permits some compression of this backing portion (by reason of the exhaust passages therein) which promote the expressing of as much liquid as possible from the backing portion when compressed as when passing through the bite of the drums. In the modification of the invention shown in FIG. 9, this property of the backing portion additionally is important in enabling the filter belt to pass in a course which is noncircular. It should further be noted that with the filter portion a continuous element separate and distinct from the backing portion, the filtering portion may be trained in a course where it diverges from the backing portion outside the processing chamber, thus to facilitate cleaning with backwashing.

Various modifications of the invention have been described herein. It is appreciated, however, that further changes and alterations are possible without departing from the general concepts of the invention. It is desired, therefore, to cover all such modifications and variations of the invention as would be apparent to one skilled in the art, and that come within the scope of the appended claims.

It is claimed and desired to secure by Letters Patent:

1. A filter belt means having opposite sides and laterally bounded by marginal edges, comprising a flexible and resilient backing portion having a inner face and an outer face forming one of the sides of the filter belt means, a flexible filtering portion overlying the inner face of the backing portion and having an outer face forming the other of the sides of the filter belt means, said backing portion providing a yieldable support for said filtering portion and including in its outer face a plurality of transversely extending exhaust passages which project only partially through the thickness of said backing portion and communicate with at least one of the marginal edges bounding the belt means, said backing portion also including pluralities of drainage openings through its thickness and arranged to cause a plurality of drainage openings to communicate with each of said exhaust passages, said drainage openings all being of substantially the same flow area and the drainage openings of each plurality being at intervals along the length of the respective communicating exhaust passage, and said filtering portion including interstices providing openings through its thickness in communication with said drainage openings.

2. The filter belt means of claim 1, wherein said backing and filtering portions are separate endless belts entrained one around the other, said exhaust passages are provided in said backing portion at intervals throughout the length of the latter, and said exhaust passages provide the sole discharge from said backing portion at the marginal edges of the belt means.

3. A filter belt means having opposite sides and laterally bounded by marginal edges, comprising a flexible and resilient endless backing portion having an inner face and an outer face forming one of the sides of the filter belt means, a flexible endless filtering portion overlying the inner face of the backing portion and having an outer face forming the other of the sides of the filter belt means, said backing portion providing a yieldable support for said filtering portion and including in its outer face a plurality of transversely extending exhaust passages, said exhaust passages being arranged at intervals throughout the length of said backing portion and each projecting only partially through the thickness of said backing portion, said exhaust passages being open along their lengths and transversely extending to the marginal edges of the filter belt means, said backing portion also including pluralities of drainage openings through its thickness and arranged to cause a plurality of drainage openings to communicate with each of said exhaust passages, said drainage openings all being of substantially the same flow area and the drainage openings of each plurality being at intervals along the length of the respective communicating exhaust passage, said backing portion being adapted to seal along its edges whereby said exhaust passages comprise the sole discharge from said backing portion, and said filtering portion including interstices providing openings through its thickness in communication with said drainage openings.

4. In a press, a plurality of opposed spaced-apart walls cooperating to peripherally enclose a processing chamber, said walls being impervious to liquid flow therethrough, at least one elongated filter belt means extending through said processing chamber adjacent one of said walls, said filter belt means comprising a backing portion having an inner face and an outer face opposing said one wall, said filter belt means being laterally bounded by marginal edges and including a filtering portion overlying said inner face of said backing portion and having an outer face which opposes a second of said walls, said backing portion having in its outer face a plurality of transversely extending exhaust passages at intervals along the length of said backing portion, said exhaust passages projecting only partially through the thickness of said backing portion and being open to said one wall along their lengths, said exhaust passages extending to at least one marginal edge of the filter belt means, said backing portion also including pluralities of drainage openings through its thickness and arranged to cause a plurality of drainage openings to communicate with each of said exhaust passages, said drainage openings all being of substantially the same flow area and the drainage openings of each plurality being at intervals along the length of the respective communicating exhaust passage, said filtering portion including interstices providing openings through its thickness in communication with said drainage openings, and fluid collecting means adjacent said one marginal edge of the belt means for collecting fluid from said exhaust passages.

5. In a press, a plurality of opposed spaced-apart walls cooperating to peripherally enclose a processing chamber, said walls being impervious to liquid flow therethrough, at least one endless filter belt means extending through said processing chamber along one of said walls, said filter belt means comprising a backing portion having an inner face and an outer face opposing said one wall, said filter belt means being laterally bounded by marginal edges and including a filtering portion overlying said inner face of said backing portion and having an outer face which opposes a second of said walls, said backing portion having in its outer face a plurality of transversely extending exhaust passages at intervals throughout the length of said backing portion, said exhaust passages projecting only partially through the thickness of said backing portion and being open to said one wall along their lengths, said exhaust passages extending continuously between the edges of said backing portion and being open at such edges, said backing portion also including pluralities of drainage openings through its thickness and arranged to cause a plurality of drainage openings to communicate with each of said exhaust passages, said drainage openings all being of substantially the same flow area and the drainage openings of each plurality being at intervals along the length of the respective communicating exhaust passage, said backing portion being adapted to seal along its edges whereby said exhaust passages comprise the sole discharge from said backing portion, said filtering portion including interstices providing openings through its thickness in communication with said drainage openings and fluid collecting means adjacent the marginal edges of the filter belt means for collecting liquid from said exhaust passages.

6. In a press, a plurality of opposed spaced-apart walls cooperating to peripherally enclose a processing chamber, at least one endless filter belt means driven longitudinally through said processing chamber adjacent one of said walls, said filter belt means being laterally bounded by marginal edges and having a plurality of transversely extending exhaust passages, said exhaust passages being at intervals along the length of said filter belt means and extending to at least one of said marginal edges, said filter belt means also including filtering openings adapted to receive liquid from material processed in said processing chamber and communicating with said exhaust passages for supplying the liquid thereto, and means for causing air flow through said exhaust passages whereby such air flow promotes the removal of the liquid therefrom.

7. The press of claim 6, wherein said air flow causing means comprises means for directing streams of air through said exhaust passages.

8. The press of claim 6, wherein said air flow causing means comprises means for supplying streams of air to said exhaust passages independently of said filtering openings.

9. The filter belt means of claim 3, wherein said interstices are of smaller size than said drainage openings.

10. The filter belt means of claim 3 which further comprises a porous transfer medium interposed between the filtering portion and backing portion, constructed to accommodate the flow of liquid between the interstices of the filtering portion and the drainage openings of the backing portion in directions extending laterally and through the thickness of the belt means, said transfer medium also spacing the filtering and backing portions from each other.

11. The filter belt means of claim 3, wherein said interstices are of smaller size than said drainage openings, and which further comprises a porous transfer medium interposed between the filtering portion and the backing portion, said transfer medium offering less resistance to the flow of liquid than the filtering portion in said belt means.

12. The filter belt means of claim 3, wherein said backing portion is compressible to diminish the thickness thereof, compression of said backing portion producing a resulting constriction in said exhaust passages.

13. The filter belt means of claim 12, wherein said backing portion comprises a body of plastic material having a hardness ranging from 40 to 90 durometer.

14. The filter belt means of claim 12, wherein said drainage openings have cross-sectional areas exceeding about 0.0007 square inch, and the backing portion between drainage openings is essentially nonpermeable by liquids.

15. The filter belt means of claim 3, wherein the backing portion is circumferentially enclosed by said filtering portion.

16. The filter belt means of claim 15, wherein the belt portion which is the backing portion comprises one element, and the belt portion which is the filtering portion comprises another element, which is distinct and separable from said one element and has greater length.

17. The filter belt means of claim 16, wherein the belt portion which is the backing portion is recessed on its inner face and along its length to provide a seat for the belt portion which is the filtering portion.

18. The press of claim 4, wherein said filter belt means is an elongated continuous flexible belt means which over its length is trained in a noncircular course.

19. The press of claim 18, wherein the backing portion is a continuous element, and the filtering portion is a separate continuous element of greater length than the backing portion, the filtering portion is spaced from the backing portion outside the pressing chamber of the press, and means is provided for cleaning the filtering portion where it is spaced from the backing portion.

20. The press of claim 4, wherein the backing portion is compressible; and the press includes a region spaced from said fluid-collecting means where the backing portion is compressed, and means for forcing air through the exhaust passages of the backing portion where the same is compressed in said region.

References Cited

UNITED STATES PATENTS

| | | | |
|---|---|---|---|
| 816,414 | 3/1906 | Witmer | 100—152 X |
| 3,176,607 | 4/1965 | Lapham | 210—400 X |
| 3,190,451 | 6/1965 | Holland | 210—401 X |
| 3,381,609 | 5/1968 | Malarkey | 210—401 |

REUBEN FRIEDMAN, *Primary Examiner.*

T. A. GRANGER, *Assistant Examiner.*

U.S. Cl. X.R.

210—401